(No Model.)
S. D. FIELD.
ELECTRIC MOTOR.
No. 552,521. Patented Jan. 7, 1896.
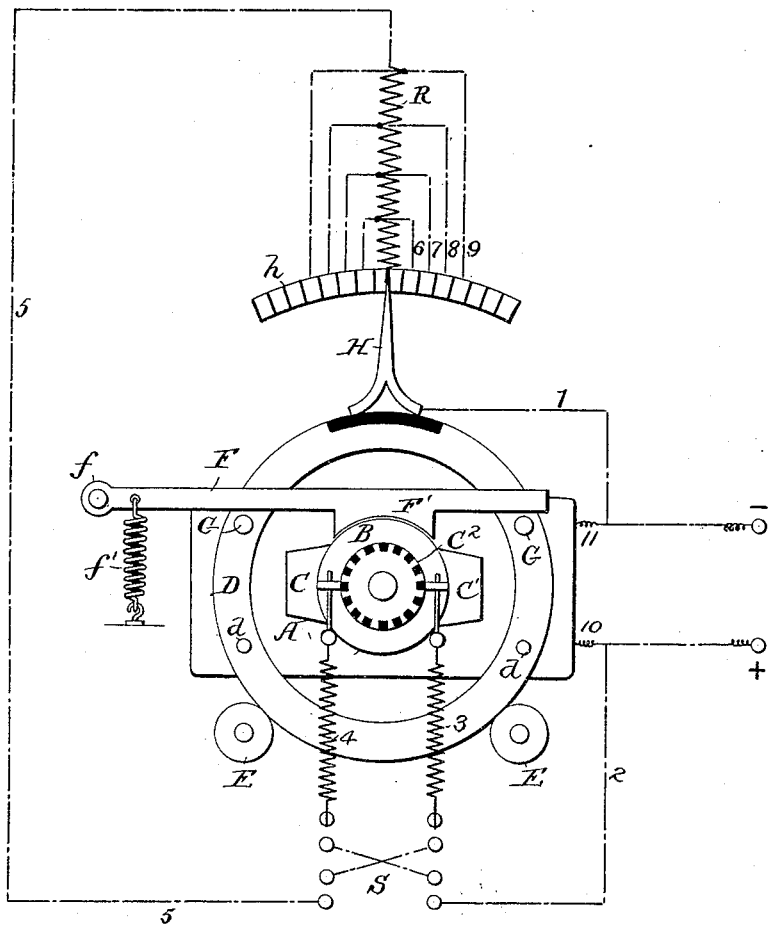
Witnesses
Jno. G. Hinkel
Alex N. Dobson
Inventor
Stephen D. Field
By Foster Freeman
Attorneys

UNITED STATES PATENT OFFICE.

STEPHEN D. FIELD, OF YONKERS, ASSIGNOR TO THE OTIS BROTHERS & COMPANY, OF NEW YORK, N. Y.

ELECTRIC MOTOR.

SPECIFICATION forming part of Letters Patent No. 552,521, dated January 7, 1896.

Application filed June 27, 1892. Serial No. 438,100. (No model.)

*To all whom it may concern:*

Be it known that I, STEPHEN D. FIELD, a citizen of the United States, and a resident of Yonkers, Westchester county, New York, have invented certain new and useful Improvements in Electric Motors, of which the following is a specification.

My invention relates to improvements in operating electric motors, and more especially to that class of electric motors which are known as "shunt-motors," and it has for its object to provide means whereby the motor can be operated so as to attain its greatest efficiency, and so that it shall be automatic in adjustment and in controlling the circuits, and so that the whole shall be simple of construction and effective in operation.

To these ends my invention consists in the various features of construction, arrangement, and mode of operation, substantially such as are hereinafter more particularly pointed out.

In the accompanying drawing I have shown a diagrammatic representation of so much of a motor and circuits as is necessary to those skilled in the art to understand the principles of my invention.

It is well known, in the operation of electric motors, in order to get the greatest efficiency the polarization of the armatures and field-magnets is desirable, and any departure from this polarization reduces the efficiency of the motor. It is also well known that in starting an electric motor from a state of rest it is desirable that the current should be gradually admitted, as through a resistance device which is gradually cut out of circuit. I have illustrated my invention in a manner in which these features may be attained, and while of course it will be understood that my invention is applicable to motors when used for any purpose, it is especially applicable to electric motors used in operating electric elevators where the motor has to be started and stopped at short intervals, and it is for this reason that I have chosen to represent my invention in this connection.

In the drawing, A represents what may be termed the "motor-frame," which may constitute the field-magnets of the motor or support the field-magnets, and B is the armature of the motor, it being shown as of a conventional form, while C C' are the brushes bearing on the commutator $C^2$ of the motor. The motor is mounted in some suitable way, so that the motor-frame is free to rotate or have a torsional action, and while various means and appliances may be used to carry out this purpose I have shown the motor-frame secured to rings or wheels D, as by the bolts $d$, only one of the wheels being shown in the drawing, and these wheels are supported on friction devices, as the friction-wheels E, so that the motor-frame and its supporting wheels or rings are free to rotate by the torque thereof in the manner hereinafter set forth.

Arranged to operate in connection with the motor is some suitable brake device, and I have shown a lever F, pivoted at $f$, and under the stress of a spring $f'$, having a bearing portion adapted to contact with the armature-shaft or some other portion connected to the armature-shaft, and, for convenience of illustration, I have shown it bearing on the outer ring of the armature. The movable frame or wheels which support the motor-frame is provided with some device which will control the brake, and in the present instance I have shown studs G G' on opposite sides of the wheel, which allow the brake to come in contact with the armature when in the position shown in the drawing, but when the wheels are turned in one direction or the other the studs raise the brake and maintain it out of position as long as the motor is in operation, and as soon as the current is cut off the stress of the spring of the brake tends to restore the wheels to their normal position, thereby carrying the frame of the motor to its normal position and allowing the brake device to be automatically applied to the armature or other rotating portion of the motor to stop the same.

Connected to the moving wheels or support for the motor-frame, preferably so as to move with it, is a contact-arm H, and this is shown as insulated from the wheel B and connected by a conductor 1 with the minus terminal of the line-circuit. The plus terminal of the line-circuit is connected by conductor 2 to a reversing-switch S, the terminals of which are connected by flexible conductors 3 and 4 with the brushes C C' of the motor, and thence the circuit leads by conductor 5 through a resistance R to the free end of the contact piece or arm H. Arranged on either side of this arm are a series of contacts $h$, which are connected by conductors 6 7 8 9, &c., with the resistance device or rheostat R in such a manner as to short-circuit or cut out portions or all of said resistance. The field-magnet circuit of the motor is connected with the plus and minus leading-wires by the flexible conductors 10 and 11, which will allow freedom of movement of the motor.

Such being the general arrangement and construction of the motor, and it being in its normal position shown in the drawing, as soon as the circuit of the motor is closed by any suitable switch (not shown) the current flows through the field-magnets in the usual way and a shunt flows through the armature in one or the other direction, according to the directions of the reversing-switch S, the resistance device R being included in the circuit. As soon as the motor commences to operate, there is a tendency for the armature to move in one direction and the field-magnets to move in an opposite direction, and this tendency results in causing the support for the motor-frame to rotate to a greater or less extent, moving the arm H to the right or left as the case may be, cutting out more or less of the resistance R, and this motion of the motor-frame raises the brake device F, which through the stress of its spring exerts a sufficient amount of force on the motor-frame support to prevent its rotating completely. The motor will operate and the field-magnets carrying the brushes assume such a position with relation to the rotating armature that polarization of the armature and field will be attained and maintained, and the motor will rotate with its greatest efficiency or with sufficient to cause it to operate the load which may be connected therewith. It will be seen in doing this the motor is practically self-regulating. Not only does the rotation of the field cut out the resistance to the armature-circuit and regulate that, but as before stated the field and armature will be properly polarized, and they will occupy the proper relations to each other to secure the greatest efficiency from the current received, and they will automatically accommodate themselves to any variations in the current received or in the work being done. As soon as the current is cut off from the motor, the brake will cause the motor-frame to assume its normal position and the brake will be applied to stop the motor and the contact-arm H, will be restored to its central position to include the resistance R in the circuit ready to be operated again. It will thus be seen that by this arrangement, the general features of which have been pointed out, the motor is practically self-regulating, controlling its own brake and circuit, and at the same time produces its highest efficiency with the least current, and can be stopped and started quickly and safely.

It will be observed that in the drawing the brushes are mounted to move with the field-magnets or frame, so that the diameter or line of commutation of the motor does not change, but the field-magnets or frame of the motor are shifted automatically to control the resistance in the armature-circuit of the motor. While this is the preferred construction, it is evident that the broad feature of varying the resistance to the armature by automatically rotating the field of the motor could be accomplished in the same way whether the brushes were stationary with relation to the line of commutation of the armature or not, and my invention, as far as the broad feature is concerned, is to be understood as including not only a machine in which the brushes are stationary with relation to the line of commutation but in which they are movable, although for many purposes it is advantageous to have the brushes stationary with respect to this line.

While I have thus described the principles of my invention and illustrated one embodiment, it will be readily observed by those skilled in the art that the details of construction and arrangement of the parts may be varied without departing from the principles set forth, and I do not, therefore, limit myself to the details shown and described.

What I claim is—

1. The combination with the motor frame carrying the field-magnets, the armature, and brushes mounted in fixed relations to the field-magnets of a support for the motor frame whereby the motor frame may be partially rotated without changing the relations of the brushes to the line of commutation, substantially as described.

2. The combination with the motor frame carrying the field-magnets, the armature, and brushes mounted in fixed relations to the field-magnets, of a support for the motor frame whereby the motor frame may be partially rotated without changing the relations of the brushes to the line of commutation, and means for restoring the motor frame to its normal position, substantially as described.

3. The combination with the motor frame carrying the field-magnets, the armature, and brushes mounted in fixed relations to the field-magnets, of a support for the motor frame whereby the motor frame may be partially rotated without changing the relations of the brushes to the line of commutation, and means moving with the motor frame for controlling the armature circuit, substantially as described.

4. The combination with the motor frame carrying the field-magnets, of a support permitting a partial rotation of the motor frame, an armature and a brake device for the armature controlled by the support, substantially as described.

5. The combination with the motor-frame carrying the field-magnets, of a support therefor permitting a partial rotation of the motor frame, an armature, a brake device for the armature, and connections between the brake device and support whereby the support will be restored to its normal position and the brake applied to the armature when the current is cut off, substantially as described.

6. The combination with the motor frame and the support therfor permitting a partial rotation of the motor frame, of a circuit of the motor including resistance, and connections applied to the support and moving therewith for controlling the resistance of the circuit, substantially as described.

7. The combination with the motor frame, of a support therefor permitting a partial rotation of the motor frame, means for restoring the motor frame to its normal position, a circuit of the motor including resistance devices, and a contact arm connected to the support and moving therewith, and arranged to control the resistance of the circuit of the motor, substantially as described.

8. The combination with the motor-frame carrying the field-magnets, of wheels supporting the motor-frame and permitting a partial rotation thereof, an armature, a brake device for said armature, and connections between the brake device and wheels for controlling the brake so that the brake tends to restore the wheels to their normal position, and when in their normal position to control the armature, substantially as described.

9. The combination with the motor-frame carrying the field-magnets, of a rotating support therefor, an armature, a brake device for the armature, an armature circuit including a reversing switch and a resistance device, and an arm connected with the support controlling said resistance device, substantially as described.

10. The combination with the motor-frame carrying the field-magnets, of a rotating support therefor, an armature, a spring-actuated brake device for the armature, means connected with the support for releasing the brake as the support rotates in either direction, and means connected with the support for controlling the current of the armature, substantially as described.

11. The method substantially as hereinbefore set forth of controlling the circuit of a shunt wound motor, which consists in automatically rotating the field of the motor and thereby varying the resistance to the armature of the motor.

12. The combination with an electric machine constructed and adapted to have a torsional action, of devices for controlling the starting and stopping of the machine connected with said machine in such manner as to be operated by the torque thereof, substantially as described.

13. The combination with an electric motor having field-magnets constructed and adapted to have a torsional movement, of a rheostat, and devices intermediate of the rheostat and said torsional field-magnets whereby the torque of the motor will serve to operate said rheostat, substantially as described.

14. The combination with an electric motor comprising a revoluble member and a member adapted to have a limited oscillatory movement, of starting devices connected with and operated by said oscillatory member, substantially as set forth.

In testimony whereof I have signed my name to this specification in the presence of two subscribing witnesses.

STEPHEN D. FIELD.

Witnesses:
JAMES S. FITCH,
RUDOLF EICKEMEYER, Jr.